Dec. 5, 1944.　　　　S. O. WHITE　　　　2,364,331
SYNCHRONIZING TRANSMISSION
Filed Sept. 16, 1942　　　2 Sheets-Sheet 2
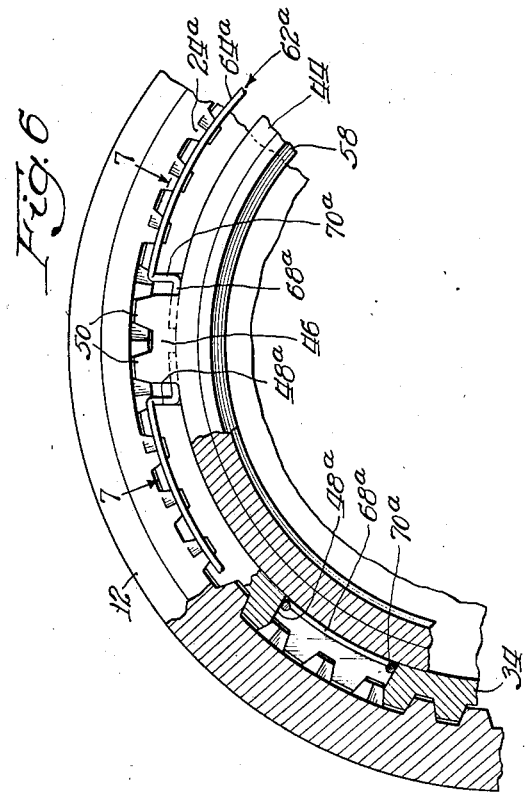
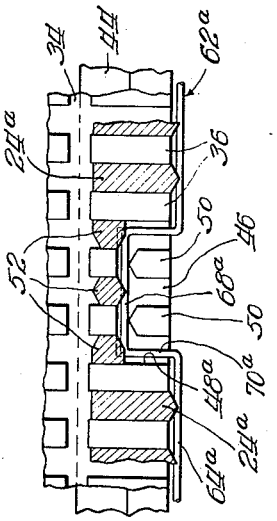
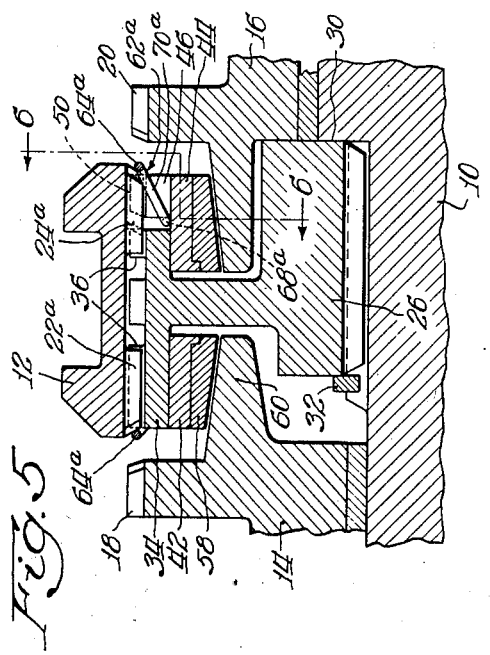
Inventor:
Samuel O. White
By Edward C. Fritzhaugh
Atty.

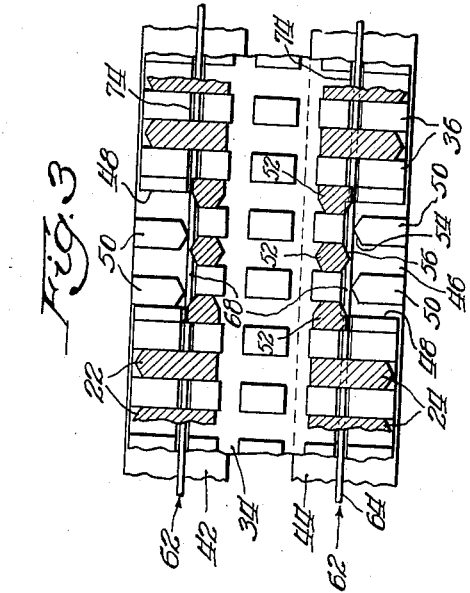
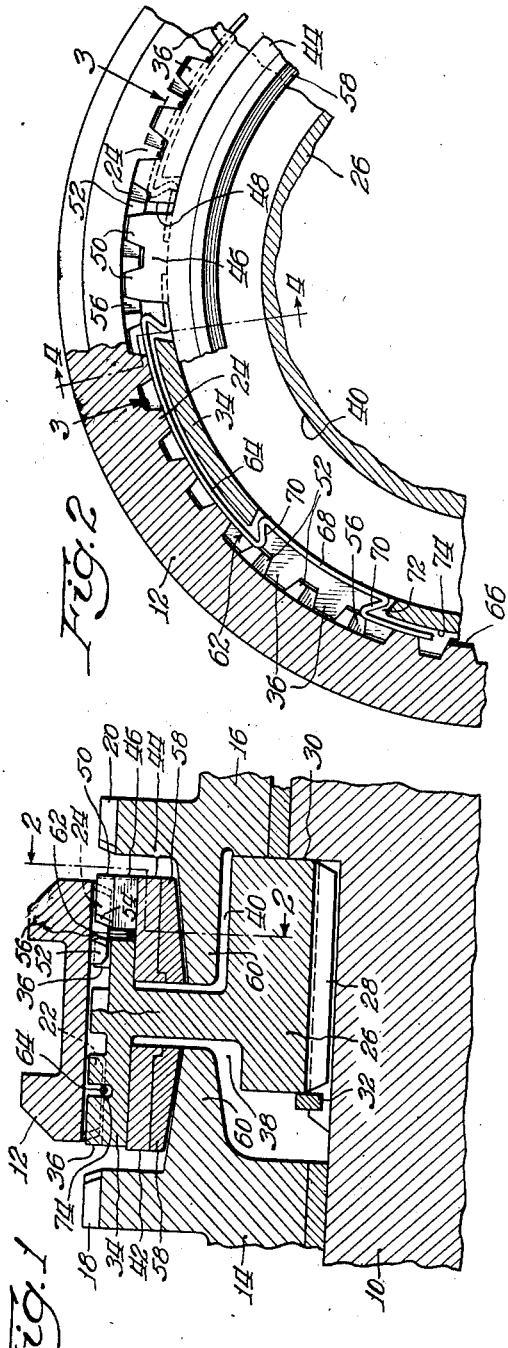
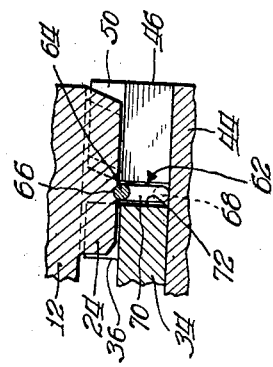
Inventor:
Samuel O. White
By Edward C. Gritzbaugh
Atty.

Patented Dec. 5, 1944

2,364,331

UNITED STATES PATENT OFFICE 2,364,331

SYNCHRONIZING TRANSMISSION

Samuel O. White, Muncie, Ind., assignor to Borg-Warner Corporation, Chicago, Ill., a corporation of Illinois Application September 16, 1942, Serial No. 458,508

8 Claims. (Cl. 192—53)

This invention relates to synchronizing transmissions wherein a pair of torque transmitting members are adapted to be drivingly connected by a shiftable jaw clutch sleeve, wherein the shifting movement of the clutch sleeve toward clutching position is blocked, as long as the members are rotating asynchronously, by a blocker element adapted to be indexed to blocking position with reference to the sleeve by frictional engagement with a friction element associated with the jaw clutch element toward which the sleeve moves to establish the driving connection.

The object of the invention is to provide a novel, improved, and simplified means for transmitting the initial shifting movement of the sleeve to the blocker element so as to insure the frictional engagement of the latter which results in the indexing of the element to blocking position.

These and other objects of this invention will become apparent from the following detailed description when taken together with the accompanying drawings in which:

Fig. 1 is an axial sectional view of a portion of a synchronizing transmission embodying the invention;

Fig. 2 is a transverse sectional view of the same taken as indicated by the line 2—2 of Fig. 1;

Fig. 3 is a sectional view of the same taken on the circumferential line 3—3 of Fig. 2;

Fig. 4 is an axial sectional view taken on the line 4—4 of Fig. 2;

Fig. 5 is an axial sectional view of a portion of a transmission embodying a modified form of the invention;

Fig. 6 is a transverse sectional view of the same taken as indicated by the line 6—6 of Fig. 5; and Fig. 7 is a sectional view taken on the circumferential line 7—7 of Fig. 6.

As an example of one form in which the invention may be embodied, I have shown in Figs. 1, 2, 3 and 4 a portion of a synchronizing transmission wherein a driven shaft 10 is adapted to be drivingly connected by a shiftable jaw clutch sleeve 12 to either of two driving members 14 and 16 respectively. The driving members 14 and 16 are equipped with clutch elements 18 and 20 respectively, having peripheral external teeth adapted to mesh with internal teeth 22, 24 respectively, of the sleeve 12.

The sleeve 12 is mounted on a hub 26 which is splined as at 28 upon the driven shaft 10 and secured in an axially fixed position between a shoulder 30 on the shaft 10 and a retaining ring 32 recessed into the shaft splines. The hub has a rim 34 which is provided with external teeth 36 with which the teeth 22 and 24 of the sleeve 12 mesh so as to provide a driving connection between the hub and the sleeve while permitting the sleeve to be shifted axially to mesh the teeth 22 with the clutch teeth 18 or the teeth 24 with the clutch teeth 20.

Defined within the rim 34 are a pair of axially opening annular depressions 38 and 40 respectively, in which are received a pair of annular blocker-synchronizer elements 42, 44. Blocker lugs 46, formed on the blocker-synchronizer elements 42 and 44, project radially outwardly through notches 48 in the rim 34 and are provided at their outer ends with blocker teeth 50 adapted, when the lugs 46 are at either extremity of oscillatory movement in the notches 48 to be positioned in blocking relation to teeth 52 formed on the sleeve 12. The teeth 52 are shorter than the teeth 22, 24, terminating short of the axial extremities of the sleeve 12 so as to form between the teeth 22, 24, spaces in which the blocker teeth 50 are received. The notches 48 are sufficiently wider than the lugs 46 to permit the latter to move a distance corresponding to substantially half the thickness of the teeth 52 on either side of the neutral or non-blocking position shown in Fig. 2. The coacting ends of the teeth 50 and 52 are chamfered as at 54 and 56 respectively, so that axial pressure of the teeth 52 against the teeth 50 will facilitate the movement of the teeth 52 into the spaces between the teeth 50 when the blocking force is relaxed, thus permitting the sleeve 12 to advance to clutching engagement with the clutch teeth 18 or 20.

The blocker elements 44 are provided with friction facings 58 which are adapted to engage coacting friction elements 60 on the driving members 14 and 16 respectively. As a result of initial frictional engagement, the blocker element 42 or 44 will be indexed to its blocking position as long as differential rotation exists between the corresponding driving member and the driven shaft 10. Further frictional engagement, under the pressure of teeth 52 bearing against teeth 50, functions to reduce the differential of rotation between the driving and driven members in order to effect synchronization. At synchronization, the differential of rotation having been eliminated, the blocker element is allowed to move to the neutral position shown in Fig. 2, permitting the sleeve 12 to advance to clutching position as previously described.

The present invention provides means for transmitting the initial shifting movement of the sleeve 12 to a blocker element 42 or 44, such thrust transmitting means being in the form of a ring 62 of spring wire having portions 64 adapted to be engaged in notches 66 in the inner faces of the teeth 22, 24 respectively, and having other portions 68 extending, in the notches 48, between the inner faces of the lugs 46 and the adjacent radial faces of the rim 34 defining the inner extremities of the notches 48. The inner portions 68 of the thrust ring are connected to the outer portions 64 by offset portions 70 which are accommodated in slots 72 extending into the rim 34 from the notches 48. Engagement of the offset portions with the extremities of notches 48 restrains the rings 62 from circumferential displacement.

The inner portions 68 engage the external cylindrical surface of the blocker element 44 so as to pilot the ring 62 in properly centered relationship to the sleeve 12 at all times. This is to prevent the ring dropping to an eccentric position when the teeth 22 or 24 have passed beyond the plane of the ring in the movement of the sleeve to clutching position.

As the sleeve 12 is shifted toward clutching position, the initial movement thereof will be transmitted to a ring 62 through the notches 66, and from the ring this movement will in turn be transmitted to the rear faces of the lugs 46, so as to urge the blocker element 44 into initial frictional engagement with a corresponding friction element 60. Such initial engagement insures the contact of teeth 52 with teeth 50, so that pressure on the sleeve 12 will be transmitted directly to the blocker element, increasing the frictional engagement so as to effect synchronization. When frictional engagement is fully effected, further movement of the blocker element is of course prevented, and when the sleeve is permitted to move on to its clutching position, the ring 64 will be retained by its engagement with the rear faces of the blocker lugs 46 against further movement with the sleeve. In riding over the outer portions of the ring, the teeth 22 or 24 will slightly compress the ring, such compression being absorbed by a slight bending of the offset portions 70. In order that the offset portions 70 may yield readily, they are preformed on diagonal rather than strictly radial lines.

The ring portions 64 extend through notches 74 in the hub splines 36, which notches 74 are somewhat wider than the thickness of the ring in order that the latter may be permitted the limited amount of axial movement necessary for transmitting thrust to corresponding blocker elements.

In the modified form of the invention shown in Figs. 5, 6 and 7, the outer portions 64a of the thrust ring are disposed radially outwardly of the plane of the outer axial extremities of the blocker lugs 46 so as to eliminate the necessity for notching the hub teeth 36. Instead of engaging in notches in the inner faces of the sleeve teeth 22, 24, the ring portions 64a are arranged to be engaged by the outer extremities of the teeth 22a, 24a.

The inner portions 68a of the thrust rings 62a are connected to the outer portions 64a by offset portions 70a extending diagonally inwardly and accommodated in the spaces between the side extremities of the notches 48a and the side extremities of the lugs 46. The inner portions 68a are entirely accommodated in the notches 48a. In this case, oscillating movement of the blocker element is limited by contact of the lugs 46 against the offset portion 70a, and the notches 48a are widened an amount equivalent to the thickness of the two offset portions 70a. As in the other form of the invention, the ring is piloted by engagement of the inner portion 68a thereof with the peripheral surface of the blocker element.

With the exception of the modified parts above described, the form of the invention shown in Figs. 5, 6 and 7 is identical with that shown in Figs. 1 to 4 inclusive, and the same reference numerals have been employed to designate such identical parts.

I claim:

1. In combination with a pair of torque transmitting members to be drivingly connected, clutch mechanism including jaw and friction clutch elements on one of said members, a jaw clutch sleeve drivingly connected to and axially shiftable on the other of said members into clutching engagement with said jaw clutch element, a blocker element interposed between said members and having a portion adapted to frictionally engage said friction clutch element and, when relative rotation between said members exists, to index said blocker element to a position wherein another portion thereof blocks axial advance of said sleeve to jaw clutching position, and means for transmitting the initial shifting movement of said sleeve to said blocker element, for insuring engagement of the latter with said friction clutch element, said means comprising a ring having a peripheral portion arranged to have releasable camming engagement with said sleeve and having another portion arranged to have direct thrust transmitting engagement with said blocking portion.

2. In combination with a pair of torque transmitting members to be drivingly connected, clutch mechanism including jaw and friction clutch elements on one of said members, a jaw clutch sleeve drivingly connected to and axially shiftable on the other of said members into clutching engagement with said jaw clutch element, a blocker element interposed between said members and having a portion adapted to frictionally engage said friction clutch element and, when relative rotation between said members exists, to index said blocker element to a position wherein another portion thereof blocks axial advance of said sleeve to jaw clutching position, and means for transmitting the initial shifting movement of said sleeve to said blocker element for insuring engagement of the latter with said friction clutch element, said means comprising a ring having a peripheral portion arranged to have releasable camming engagement with said sleeve, and having another portion in piloting and direct thrust transmitting engagement with said blocker element.

3. In a transmission, in combination with a pair of torque transmitting members to be drivingly connected, jaw and friction clutch elements on one of said members, a hub element drivingly mounted on the other of said members and having a peripheral rim defining an axially opening annular recess, a jaw clutch sleeve encircling, drivingly connected to and axially shiftable on said rim into clutching engagement with said jaw clutch element, a blocker element extending axially into said recess and having radially outwardly projecting blocker lugs, said rim having notches through which said lugs extend with circumferential play permitting said blocker element to be indexed relative to said sleeve into a position blocking axial advance of the sleeve, said blocker element having a friction face adapted to engage said friction clutch element so as to cause the said indexing of the blocker element when differential rotation exists between said members, and means for transmitting the initial axial movement of said sleeve to said blocker element for insuring the engagement of said friction surface with said friction element, said means comprising a ring having a peripheral portion arranged to have releasable camming engagement with said sleeve and having other portions interposed between said blocker lugs and said rim, and adapted to have thrust transmitting engagement with said lugs.

4. In a transmission, in combination with a pair of torque transmitting members to be drivingly connected, jaw and friction clutch elements on one of said members, a hub element drivingly mounted on the other of said members and having a peripheral rim defining an axially opening annular recess, a jaw clutch sleeve encircling, drivingly connected to and axially shiftable on said rim into clutching engagement with said jaw clutch element, a blocker element extending axially into said recess and having radially outwardly projecting blocker lugs, said rim having notches through which said lugs extend with circumferential play permitting said blocker element to be indexed relative to said sleeve into a position blocking axial advance of the sleeve, said blocker element having a friction face adapted to engage said friction clutch element so as to cause the said indexing of the blocker element when differential rotation exists between said members, and means for transmitting the initial axial movement of said sleeve to said blocker element for insuring the engagement of said friction surface with said friction element, said means comprising a ring having a peripheral portion arranged to have thrust receiving engagement with said sleeve and having other portions confined between said blocker lugs and said rim, said other portions being adapted to engage the periphery of the blocker element for centering the ring with reference to the sleeve, and being arranged to engage said lugs so as to transmit thereto the thrust received from said sleeve.

5. In a transmission, in combination with a pair of torque transmitting members to be drivingly connected, jaw and friction clutch elements on one of said members, a hub element drivingly mounted on the other of said members and having a peripheral rim defining an axially opening annular recess, a jaw clutch sleeve encircling, drivingly connected to and axially shiftable on said rim into clutching engagement with said jaw clutch element, a blocker element extending axially into said recess and having radially outwardly projecting blocker lugs, said rim having notches through which said lugs extend with circumferential play permitting said blocker element to be indexed relative to said sleeve into a position blocking axial advance of the sleeve, said blocker element having a friction face adapted to engage said friction clutch element so as to cause the said indexing of the blocker element when differential rotation exists between said members, and means for transmitting the initial axial movement of said sleeve to said blocker element for insuring the engagement of said friction surface with said friction element, said means comprising a ring having a peripheral portion arranged to have thrust receiving engagement with said sleeve and having other portions confined between said blocker lugs and said rim at the axially inner extremities of said notches, said other portions being adapted to engage the periphery of the blocker element for centering the ring with reference to the sleeve, being arranged to engage said lugs so as to transmit thereto the thrust received from said sleeve, and having offset portions connecting the previously mentioned portions and embraced between portions of said rim to restrain circumferential movement of the ring relative to the sleeve.

6. In a transmission, in combination with a pair of torque transmitting members to be drivingly connected, clutching mechanism comprising jaw and friction clutch elements on one of said members, a hub element drivingly mounted on the other member and having a peripheral rim defining an axially opening annular recess, said rim having external teeth and notches opening into the axial extremities thereof, a jaw clutch sleeve encircling said rim, said sleeve having internal teeth meshing with said rim teeth and being axially shiftable to bring said internal teeth into engagement with the jaw clutch element, said internal teeth including full length teeth and interposed groups of shortened teeth terminating short of the outer extremities of said full length teeth, a blocker element interposed between said hub and said one torque transmitting member, extending axially into said recess, having an internal friction face for engagement with said friction element and having blocker lugs extending radially outwardly through said notches and into the spaces between the outer extremities of said shortened teeth and the adjacent full length teeth and adapted, when said friction face is in engagement with said friction element while differential rotation exists between said members, to be indexed to a position in blocking relation to said shortened teeth so as to obstruct advance of said sleeve to clutching position until such differential rotation has subsided, and means for transmitting the initial shifting movement of said sleeve to said blocker element for insuring the engagement of said friction face against said friction element, said last means comprising an annular spring having peripheral portions arranged to have thrust receiving association with at least some of said internal teeth and including other portions interposed between adjacent radial faces of said rim and said blocker lug and adapted to engage said lug to transmit such initial shifting movement to the blocker element.

7. Clutch mechanism as defined in claim 6, wherein said peripheral portions of the ring are disposed outwardly of the outer extremities of the rim teeth and wherein said ring includes pairs of generally axially extending portions connecting said peripheral portions and said other portions and interposed between the circumferential extremities of said lugs and their respective notches.

8. Clutch mechanism as defined in claim 6, wherein the peripheral portions of said ring are disposed substantially in the same plane as said other portions but radially outwardly thereof, wherein said rim teeth are notched to receive said peripheral portions and permit limited axial movement thereof, wherein said sleeve teeth have detent notches adapted to receive said peripheral portions for transmitting thrust thereto and to permit said peripheral portions to yield radially inwardly so as to allow the sleeve to advance to clutching position, and wherein said ring includes pairs of generally radially extending portions connecting said peripheral portion and said other portions and accommodated within said rim notches.

SAMUEL O. WHITE.